US010228472B2

(12) United States Patent
Uchida

(10) Patent No.: US 10,228,472 B2
(45) Date of Patent: Mar. 12, 2019

(54) RADIATION POSITION DETECTION METHOD, RADIATION POSITION DETECTOR, AND PET APPARATUS

(71) Applicant: HAMAMATSU PHOTONICS K.K., Hamamatsu-shi, Shizuoka (JP)

(72) Inventor: Hiroshi Uchida, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/846,483

(22) Filed: Dec. 19, 2017

(65) Prior Publication Data
US 2018/0180745 A1 Jun. 28, 2018

(30) Foreign Application Priority Data

Dec. 22, 2016 (JP) .................. 2016-249656

(51) Int. Cl.
*G01T 1/20* (2006.01)
*G01T 1/29* (2006.01)
*G01T 1/164* (2006.01)

(52) U.S. Cl.
CPC .......... *G01T 1/2002* (2013.01); *G01T 1/1647* (2013.01); *G01T 1/2985* (2013.01)

(58) Field of Classification Search
CPC .... G01T 1/1647; G01T 1/2002; G01T 1/2985
See application file for complete search history.

(56) References Cited

U.S. PATENT DOCUMENTS

2010/0327168 A1* 12/2010 Yamada ................ G01T 1/1644
250/362

OTHER PUBLICATIONS

Frach, Thomas, et al., "The Digital Silicon Photomultiplier—System Architecture and Performance Evaluation," Nuclear Science Symposium Conference Record, IEEE, Nov. 13, 2010, pp. 1722-1727.

* cited by examiner

*Primary Examiner* — Mark R Gaworecki
(74) *Attorney, Agent, or Firm* — Drinker Biddle & Reath LLP

(57) ABSTRACT

In a radiation position detection method, a scintillator that initially generates scintillation light is specified on the basis of a two-dimensional map showing regions for identifying a plurality of scintillators and the centroid position of positions where the scintillation light is generated. The regions shown in the two-dimensional map includes a first region corresponding to a first scintillator which is one of the plurality of scintillators, a second region corresponding to a second scintillator adjacent to the first scintillator among the plurality of scintillators, a third region that is located on the first region side and corresponds to the second scintillator, and a fourth region that is located on the second region side and corresponds to the first scintillator.

12 Claims, 13 Drawing Sheets

RADIATION POSITION DETECTION METHOD, RADIATION POSITION DETECTOR, AND PET APPARATUS

TECHNICAL FIELD

This disclosure relates to a radiation position detection method, a radiation position detector, and a PET apparatus.

BACKGROUND

In a Positron Emission Tomography (PET) apparatus or the like, a radiation position detector provided with a scintillator array and a light detector array is used. The scintillator array includes a plurality of scintillators which are two-dimensionally arranged, and each of the scintillators absorbs radiation and generates scintillation light. The light detector array includes a plurality of light detectors arranged to correspond to the plurality of scintillators, and each of the light detectors outputs an electrical signal in response to the intensity of the scintillation light. For example, in Thomas Frach, et al., "The Digital Silicon Photomultiplier System Architecture and Performance Evaluation", Nuclear Science Symposium Conference Record, IEEE, 2010, pp. 1722 to 1727, a method of calculating the centroid position of positions where scintillation light is detected on the basis of an electrical signal output from a light detector is described.

SUMMARY

Regarding the radiation position detection as described above, there may be cases where scintillation light is generated by different scintillators due to Compton scattering caused by radiation (for example, γ rays or X-rays). In such cases, the scintillator that initially generates the scintillation light has to be specified. However, when the scintillator is specified on the basis of the centroid position of the positions where the scintillation light is detected, there is concern that the scintillator that initially generates the scintillation light may not be specified but the scintillator that generates the scintillation light after the scattering of the radiation may be specified. The reason is that the intensity of the scintillation light generated after the scattering of the radiation due to the Compton scattering tends to be greater than the intensity of the scintillation light that is initially generated.

An object of this disclosure is to provide a radiation position detection method, a radiation position detector, and a PET apparatus capable of accurately specifying a scintillator that initially generates scintillation light.

According to an embodiment of this disclosure, a radiation position detection method performed by a radiation position detector including a scintillator array in which a plurality of scintillators that absorb radiation and generate scintillation light are two-dimensionally arranged, and a light detector array in which a plurality of light detectors that output an electrical signal in response to an intensity of the scintillation light are arranged to correspond to the plurality of scintillators. The radiation position detection method includes: a first step of calculating a centroid position of positions where the scintillation light is detected on the basis of the electrical signal; and a second step of specifying the scintillator that initially generates the scintillation light on the basis of a two-dimensional map showing regions for identifying the plurality of scintillators and the centroid position, in which the regions shown in the two-dimensional map include a first region corresponding to a first scintillator which is one of the plurality of scintillators, a second region corresponding to a second scintillator adjacent to the first scintillator among the plurality of scintillators, a third region that is located on the first region side between the first region and the second region and corresponds to the second scintillator, and a fourth region that is located on the second region side between the first region and the second region and corresponds to the first scintillator, and in the second step, in a case where the centroid position is located in the first region or the fourth region, the first scintillator is specified as the scintillator that initially generates the scintillation light, and in a case where the centroid position is located in the second region or the third region, the second scintillator is specified as the scintillator that initially generates the scintillation light.

According to the embodiment of this disclosure, a radiation position detector and a PET apparatus includes: a scintillator array in which a plurality of scintillators that absorb radiation and generate scintillation light are two-dimensionally arranged; a light detector array in which a plurality of light detectors that output an electrical signal in response to an intensity of the scintillation light are arranged to correspond to the plurality of scintillators; a calculation unit which calculates a centroid position of positions where the scintillation light is detected on the basis of the electrical signal; and a specifying unit which specifies the scintillator that initially generates the scintillation light on the basis of a two-dimensional map showing regions for identifying the plurality of scintillators and the centroid position, in which, in the two-dimensional map, a first scintillator and a second scintillator which are adjacent to each other among the plurality of scintillators are shown, a first region corresponding to the first scintillator which is one of the plurality of scintillators, a second region corresponding to the second scintillator adjacent to the first scintillator among the plurality of scintillators, a third region that is located on the first region side between the first region and the second region and corresponds to the second scintillator, and a fourth region that is located on the second region side between the first region and the second region and corresponds to the first scintillator, and the specifying unit specifies, in a case where the centroid position is located in the first region or the fourth region, the first scintillator as the scintillator that initially generates the scintillation light, and specifics, in a case where the centroid position is located in the second region or the third region, the second scintillator as the scintillator that initially generates the scintillation light.

According to the embodiment of this disclosure, in the radiation position detection method, the radiation position detector, and the PET apparatus, in a case where scintillation light is generated only by the first scintillator, since the centroid position of the position where the scintillation light is detected is located in the first region corresponding to the first scintillator, the first scintillator is correctly specified as the scintillator that initially generates the scintillation light. Similarly, even in a case where scintillation light is generated only by the second scintillator, the second scintillator is correctly specified as the scintillator that initially generates the scintillation light. Here, when radiation causes Compton scattering in the first scintillator and scintillation light is generated by each of the first scintillator and the second scintillator, the intensity of the scintillation light generated by the second scintillator tends to be higher than the intensity of the scintillation light generated by the first scintillator. Therefore, the centroid position of the positions where the scintillation light is detected tends to be located in the fourth region located on the second region side between the first region and the second region. Even in this case, since the fourth region corresponds to the first scintillator, the first scintillator is correctly specified as the scintillator that initially generates the scintillation light. Even in a case where radiation causes Compton scattering in the second scintillator and scintillation light is generated by each of the first scintillator and the second scintillator, the second scintillator is correctly specified as the scintillator that initially generates the scintillation light. Therefore, with the radiation position detection method, the radiation position detector, and the PET apparatus according to the embodiment of this disclosure, the scintillator that initially generates scintillation light can be accurately specified.

A light shielding layer that shields the scintillation light may be provided between the plurality of scintillators. Accordingly, a leak of scintillation light from the scintillator that generates the scintillation light into the scintillator adjacent to the above scintillator can be prevented, and thus the scintillator that initially generates the scintillation light can be more accurately specified.

Each of the plurality of light detectors may be connected to a resistor chain. Accordingly, the centroid position of positions where scintillation light is detected can be easily and accurately calculated.

The single first scintillator may be adjacent to a plurality of the second scintillators, and a plurality of the third regions respectively corresponding to the plurality of second scintillators are separated from each other by fifth regions. In the second step, in a case where the centroid position is located in the fifth region, specification of the scintillator that initially generates the scintillation light may not be performed. Accordingly, a case where the centroid position of positions where scintillation light is detected is located in the fifth region is cancelled as an inappropriate signal, and thus the specification of the scintillator that initially generates the scintillation light can be simplified.

The single first scintillator may be adjacent to a plurality of the second scintillators, and a plurality of the third regions respectively corresponding to the plurality of second scintillators may be in contact with one another. Accordingly, even in a case where the centroid position of positions where scintillation light is detected is located in any region, the specification of the scintillator that initially generates the scintillation light can be performed.

According to the embodiment of this disclosure, a scintillator that initially generates scintillation light can be accurately specified.

DETAILED DESCRIPTION

Figure 1B:
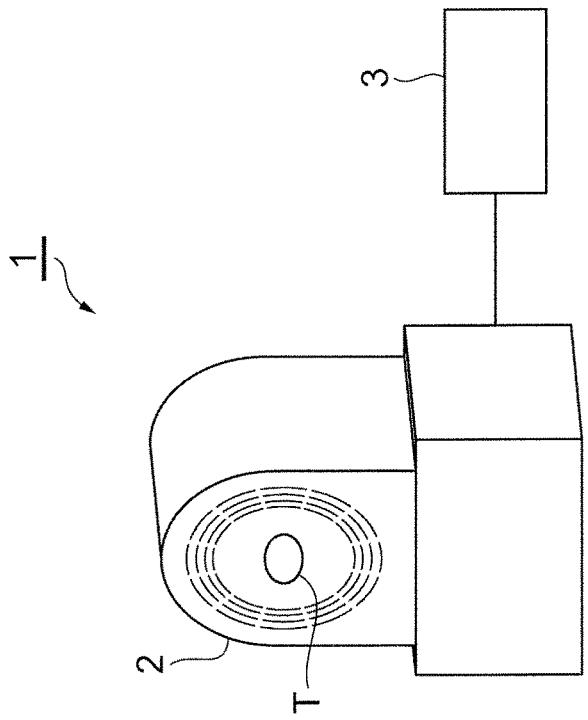
FIG. 1B is a schematic view of a detector ring of the PET apparatus of FIG. 1A.

Hereinafter, an embodiment of a radiation position detector according to an embodiment of this disclosure will be described in detail with reference to the accompanying drawings. In the description of the drawings, like elements are denoted by like reference numerals, and overlapping descriptions will be omitted.

Figure 1A:
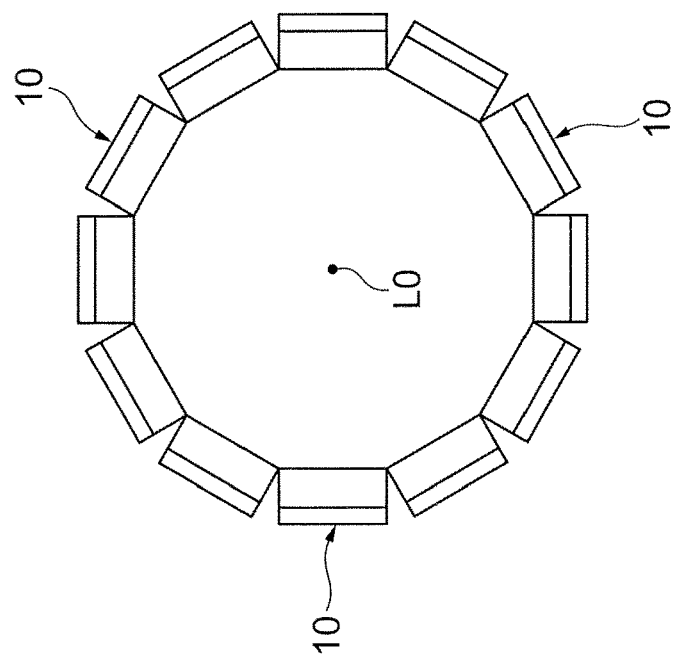
FIG. 1A is a schematic view of a PET apparatus of an embodiment.

As illustrated in FIG. 1A, a PET apparatus 1 includes a bed (not illustrated) on which a subject T is placed, a gantry 2 having an opening with a circular section shape, and an image processing unit 3 to which data detected by a detector ring in the gantry 2 is transmitted. As illustrated in FIG. 1B, in the detector ring in the gantry 2 of the PET apparatus 1, on a circumference having a predetermined line L0 as the center line, a plurality of radiation position detectors 10 are arranged in a ring shape while being in contact with one another. The PET apparatus 1 is an apparatus that detects γ rays (radiation) emitted from the subject T to which a drug labeled with a positron-emitting radionuclide (a radioisotope emitting positrons) is administered. With the PET apparatus 1, a tomographic image of the subject T at a plurality of slice positions can be acquired.

Figure 2:
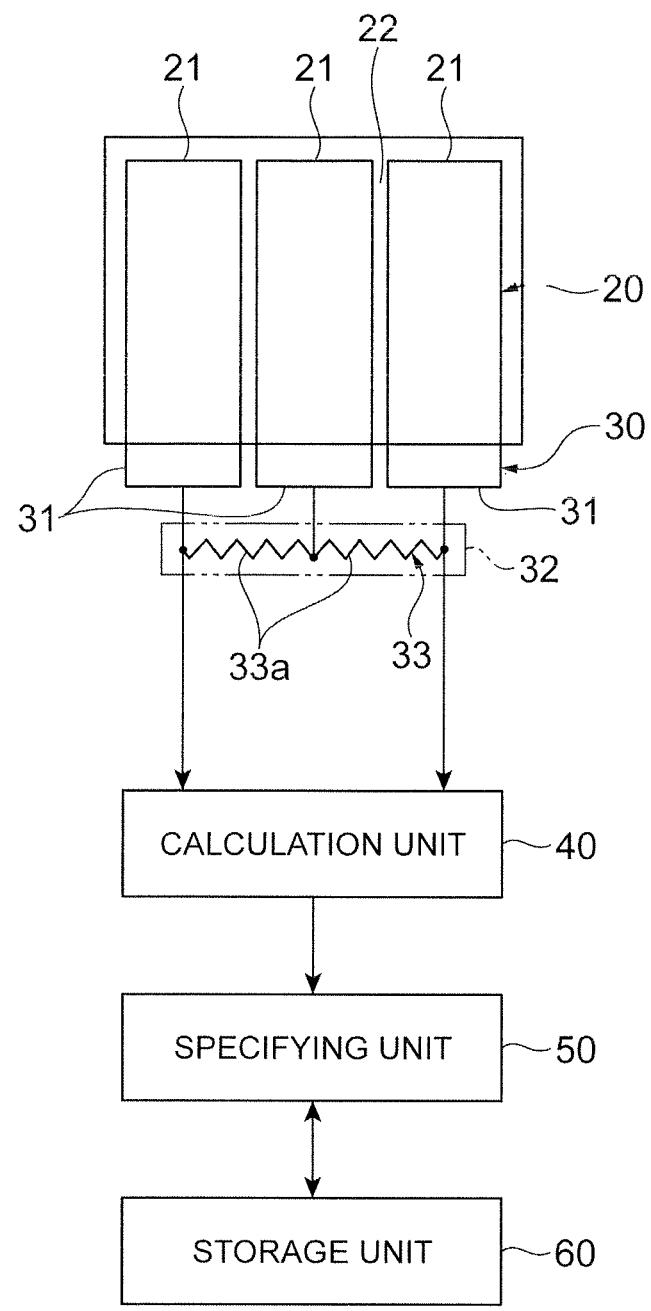
FIG. 2 is a configuration view of a radiation position detector of the embodiment.

As illustrated in FIG. 2, the radiation position detector 10 includes a scintillator array 20, a light detector array 30, a calculation unit 40, a specifying unit 50, and a storage unit 60. In FIG. 2, the scintillator array 20 and the light detector array 30 are illustrated in a side view, and the calculation unit 40, the specifying unit 50, and the storage unit 60 are illustrated in a block diagram.

The scintillator array 20 includes a plurality of scintillators 21 and a light shielding layer 22. The plurality of scintillators 21 are two-dimensionally arranged. In this embodiment, the plurality of scintillators 21 are arranged in a matrix form along each direction of the row direction and the column direction. Each of the scintillators 21 absorbs γ rays and generates scintillation light. As an example, each of the scintillators 21 has a quadrangular prism shape.

The light shielding layer 22 is provided between the plurality of scintillators 21, and on the outer surfaces of the plurality of scintillators 21. That is, the light shielding layer 22 covers the scintillators 21 excluding the surfaces of the scintillators 21 to which light detectors 31 are optically connected. The light shielding layer 22 shields the scintillation light generated by the scintillators 21 while passing the γ rays. For example, the light shielding layer 22 is a Teflon (registered trademark) tape or a high reflective multilayer film and is configured by being inserted between the scintillators 21.

The light detector array 30 includes a plurality of the light detectors 31 and an output extraction portion 32. The plurality of light detectors 31 are arranged to correspond to the plurality of scintillators 21. In this embodiment, the plurality of light detectors 31 are arranged to respectively correspond to the plurality of scintillators 21 in one-to-one correspondence. The scintillator 21 is optically connected onto the light detection surface of the corresponding light detector 31. The light detector 31 detects the scintillation light generated by the scintillator 21 and outputs an electrical signal in response to the intensity of the scintillation light. As an example, the light detector 31 is a Silicon Photomultiplier (SiPM), and outputs a pulsed electrical signal amplified in response to the intensity of the scintillation light.

The output extraction portion 32 includes a resistor chain 33. Each of the plurality of light detectors 31 is connected to the resistor chain 33. In the resistor chain 33, the light detectors 31 adjacent to each other in the row direction are connected to each other via resistors 33a, the light detectors 31 adjacent to each other in the column direction on one end side in the row direction are connected to each other via resistors 33a, and the light detectors 31 adjacent to each other in the column direction on the other end side in the row direction are connected to each other via resistors 33a. The electrical signal output from each of the light detectors 31 is extracted from each of both ends of a plurality of the resistors 33a connected in the column direction on one end side in the row direction, and each of both ends of the plurality of resistors 33a connected in the column direction on the other end side in the row direction.

The calculation unit 40 is electrically connected to the output extraction portion 32. The calculation unit 40 calculates the centroid position of positions where scintillation light is detected on the basis of the electrical signal extracted from the light detector array 30. In a case where an electrical signal is output from one light detector 31, the centroid position of positions where scintillation light is detected is the position of the one light detector 31. On the other hand, in a case where electrical signals are output from a plurality of the light detectors 31, the centroid position of positions where scintillation light is detected is the centroid position obtained by weighting the positions of the plurality of light detectors 31 by the intensities of the electrical signals. Here, an example of calculation of the centroid position by the calculation unit 40 will be described. The calculation unit 40 monitors electrical signals V1, V2, V3, and V4 extracted from the output extraction portion 32, and when any of the electrical signals V1, V2, V3, and V4 exceeds a threshold, a ratio F1 and a ratio F2 are calculated by Formulas (1) and (2) or Formulas (3) and (4). In addition, the calculation unit 40 calculates a centroid position X in the row direction on the basis of the ratio F1, and calculates a centroid position Y in the column direction on the basis of the ratio F2.

[Formula 1]
$$F1 = \frac{(V1+V3)-(V2+V4)}{V1+V2+V3+V4} \quad (1)$$

[Formula 2]
$$F2 = \frac{(V1+V2)-(V3+V4)}{V1+V2+V3+V4} \quad (2)$$

[Formula 3]
$$F1 = \frac{V1+V3}{V1+V2+V3+V4} \quad (3)$$

[Formula 4]
$$F2 = \frac{V1+V2}{V1+V2+V3+V4} \quad (4)$$

The specifying unit 50 is electrically connected to the calculation unit 40. The specifying unit 50 specifies, on the basis of a two-dimensional map showing regions for individually identifying the plurality of scintillators 21 and the centroid position (X,Y) output from the calculation unit 40, the scintillator 21 that initially reacts with γ rays, that is, the scintillator 21 that initially generates the scintillation light. In a case where one scintillator 21 generates the scintillation light, the scintillator 21 that initially generates the scintillation light is the one scintillator 21. On the other hand, in a case where a plurality of the scintillators 21 generate scintillation light, the scintillator 21 that initially generates the scintillation light is the scintillator 21 that initially generates the scintillation light in terms of time among the plurality of scintillators 21.

Here, an example of the two-dimensional map will be described. For convenience of description, In FIG. 3, a plurality of scintillator regions 21A respectively corresponding to the plurality of scintillators 21 are shown in a two-dimensional map M1. However, the plurality of scintillator regions 21A do not need to be shown in the two-dimensional map M1.

Figure 3:
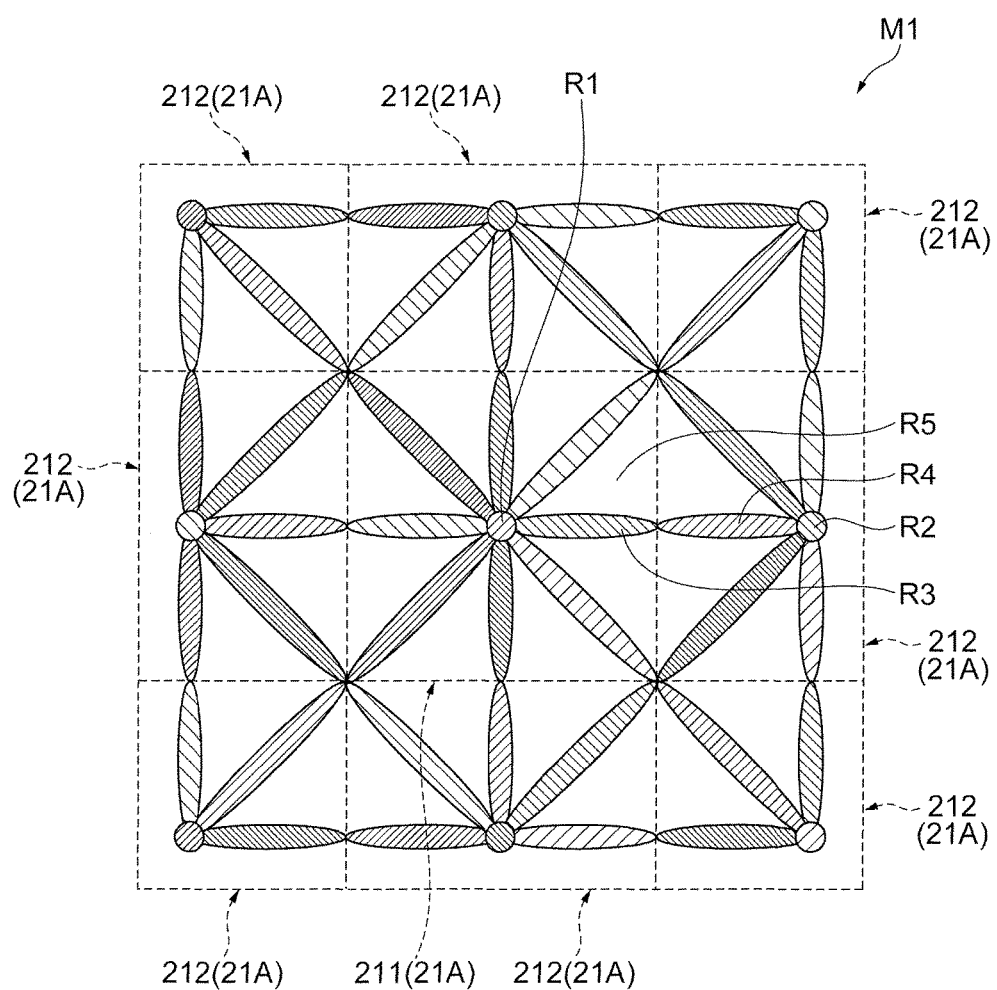
FIG. 3 is a view illustrating an example of a two-dimensional map used in the radiation position detector of FIG. 2.

As illustrated in FIG. 3, each of the scintillator regions 21A has a square shape, and to one scintillator region 21A, the eight scintillator regions 21A are adjacent in the row direction, the column direction, and two diagonal directions. Assuming that one scintillator region 21A shown at the center in FIG. 3 is referred to as a first scintillator region 211 and the eight scintillator regions 21A adjacent to the first scintillator region 211 are referred to as second scintillator regions 212 and focusing on the first scintillator region 211 and the second scintillator region 212 on the right thereof, in the two-dimensional map M1, a first region R1, a second region R2, and a third region R3, and a fourth region R4 are shown. The first scintillator region 211 corresponds to a first scintillator which is one of the plurality of scintillators 21. The second scintillator region 212 corresponds to a second scintillator adjacent to the first scintillator among the plurality of scintillators 21.

The first region R1 includes a centroid distribution based on the scintillation light generated only by the first scintillator (a distribution of the centroid position of positions where the scintillation light is generated), and corresponds to the first scintillator. The first region R1 has a circular shape and is located at the center of the first scintillator region 211. The second region R2 includes a centroid distribution based on the scintillation light generated only by the second scintillator, and corresponds to the second scintillator. The second region R2 has a circular shape and is located at the center of the second scintillator region 212.

The third region R3 is located on the first region R1 side between the first region R1 and the second region R2, and corresponds to the second scintillator. The third region R3 has an elongated shape with a direction along the straight line connecting the first region R1 and the second region R2 as the longitudinal direction thereof, and is located on the straight line connecting the first region R1 and the second region R2 in the first scintillator region 211. The fourth region R4 is located on the second region R2 side between the first region R1 and the second region R2, and corresponds to the first scintillator. The fourth region R4 has an elongated shape with the direction along the straight line connecting the first region R1 and the second region R2 as the longitudinal direction thereof, and is located on the straight line connecting the first region R1 and the second region R2 in the second scintillator region 212.

The relationship between the first region R1, the second region R2, the third region R3, and the fourth region R4 described above is established between the first scintillator region 211 and each of the plurality of second scintillator regions 212 adjacent to the first scintillator region 211. In the first scintillator region 211, a plurality of the third regions R3 respectively corresponding to a plurality of the second scintillators are separated from each other by fifth regions R5. In the two-dimensional map M1, even when any one scintillator region 21A is regarded as the first scintillator region 211, the relationship between the first region R1, the second region R2, the third region R3, and the fourth region R4 described above is established.

The specifying unit 50 determines the position in the two-dimensional map M1 where the centroid position (X,Y) calculated by the calculation unit 40 is located. In addition, the specifying unit 50 specifies the scintillator 21 corresponding to the region where the centroid position (X,Y) is located as the scintillator 21 that initially generates the scintillation light. In the example illustrated in FIG. 3, in a case where the centroid position (X,Y) is located in the first region R1 or the fourth region R4, the specifying unit 50 specifies the first scintillator as the scintillator 21 that initially generates the scintillation light. On the other hand, in a case where the centroid position (X,Y) is located in the second region R2 or the third region R3, the specifying unit 50 specifies the second scintillator as the scintillator 21 that initially generates the scintillation light. In a case where the centroid position (X,Y) is located in the fifth region R5, the specifying unit 50 does not specify the scintillator 21 that initially generates the scintillation light.

The storage unit 60 is electrically connected to the specifying unit 50. The storage unit 60 is configured as a storage medium represented by, for example, a Read-only Memory (ROM) or a Random-Access Memory (RAM). The storage unit 60 stores, for example, the two-dimensional map M1 and other information.

Figure 4:
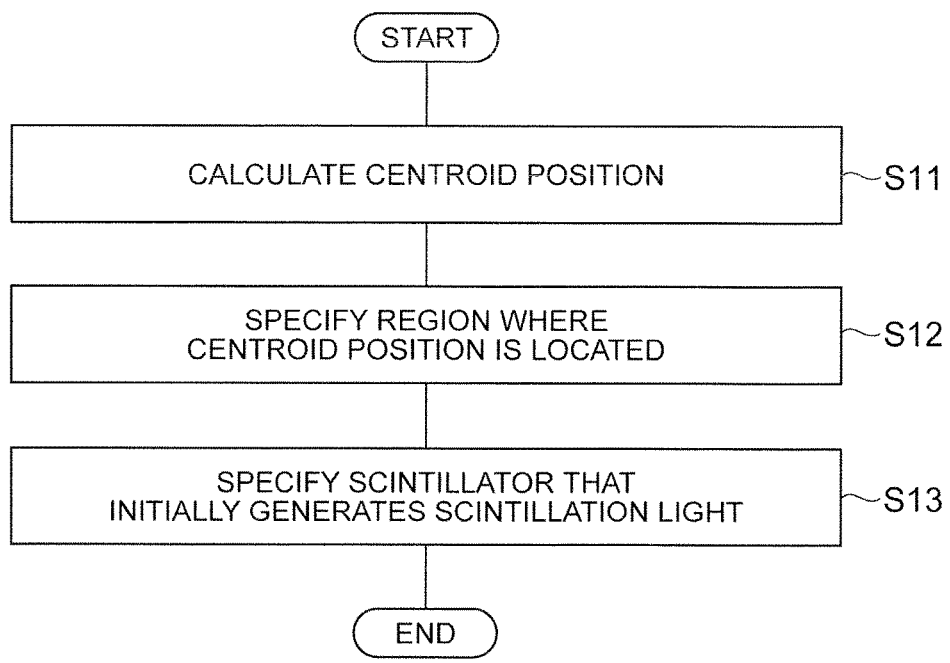
FIG. 4 is a flowchart showing a radiation position detection method of the embodiment.

Next, a radiation position detection method performed by the radiation position detector 10 will be described with reference to FIG. 4. First, the calculation unit 40 calculates the centroid position (X,Y) of the positions where the scintillation light is detected on the basis of the electrical signals V1, V2, V3, and V4 extracted by the output extraction portion 32 of the light detector array 30 (first step S11). Specifically, as described above, the calculation unit 40 calculates the ratio F1 and the ratio F2 from the electrical signals V1, V2, V3, and V4 using Formulas (1) and (2) or Formulas (3) and (4), and calculates the centroid position (X,Y) on the basis of the ratio F1 and the ratio F2.

Next, the specifying unit 50 determines the region in the two-dimensional map M1 where the centroid position (X,Y) calculated by the calculation unit 40 is located (second step S12). In addition, the specifying unit 50 specifies the scintillator 21 corresponding to the region where the centroid position (X,Y) is located as the scintillator 21 that initially generates the scintillation light (second step S13). Specifically, as described above, in a case where the centroid position (X,Y) is located in the first region R1 or the fourth region R4, the specifying unit 50 specifies the first scintillator as the scintillator 21 that initially generates the scintillation light. On the other hand, in a case where the centroid position (X,Y) is located in the second region R2 or the third region R3, the specifying unit 50 specifies the second scintillator as the scintillator 21 that initially generates the scintillation light. In a case where the centroid position (X,Y) is located in the fifth region R5, the specifying unit 50 does not specify the scintillator 21 that initially generates the scintillation light.

The effects exhibited by the radiation position detector 10 and the PET apparatus 1 configured as described above, and the radiation position detection method performed by the radiation position detector 10 will be described together with the problems of the related art.

In a radiation position detector used in a PET apparatus or the like, in order to improve image resolution and quantitativeness in the PET apparatus, it is desirable to accurately specify a scintillator that initially generates scintillation light with good accuracy. Here, for example, it is considered that by reducing the size of individual scintillators, a larger number of scintillators are arranged in the radiation position detector. As light detectors that can be arranged to respectively correspond to the scintillators in one-to-one correspondence, for example, there are SiPMs such as Multi-Pixel Photon Counter (MPPC, registered trademark). For example, the light detector of the radiation position detector described in Thomas Frach, et al., "The Digital Silicon Photomultiplier System Architecture and Performance Evaluation", Nuclear Science Symposium Conference Record, IEEE, 2010, pp. 1722 to 1727 is a SiPM. In the radiation position detector, it is considered that the scintillator that generates scintillation light is specified on the basis of the centroid position of positions where the scintillation light is detected and a two-dimensional map showing regions for individually identifying the scintillators. It is known that the centroid position calculated by the radiation position detector appears in circular distributions A1 and elongated distributions A2 connecting the adjacent circular distributions A1 shown in the flood map of FIG. 5.

Figure 5:
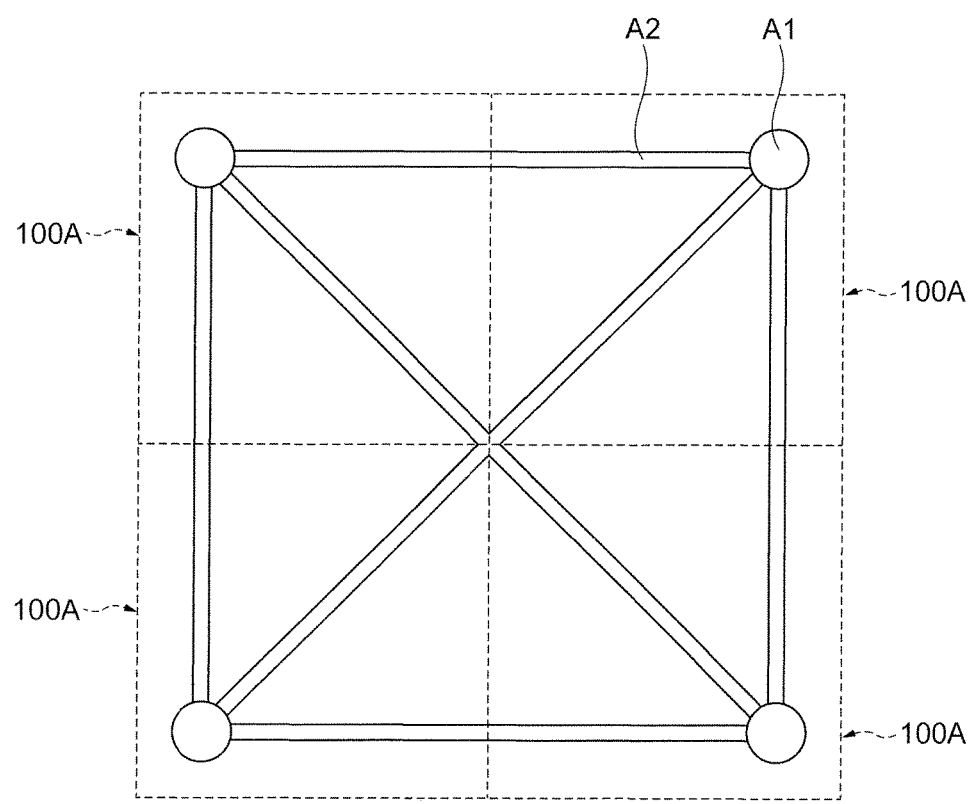
FIG. 5 is a view illustrating a flood map.

In the flood map of FIG. 5, for convenience of description, a plurality of scintillator regions 100A respectively corresponding to a plurality of scintillators are shown. In the flood map of FIG. 5, four scintillator regions 100A correspond to the arrangement of four scintillators arranged in a matrix form along each direction of the row direction and the column direction. Each of the scintillator regions 100A includes the circular distribution A1. The elongated distributions A2 connect the adjacent circular distributions A1 in a lattice pattern or a cross pattern. In a case where only one scintillator among the plurality of scintillators generates scintillation light, the centroid position appears in the circular distribution A1 included in the scintillator. On the other hand, in a case where Compton scattering of γ rays occurs and scintillation light is generated by two scintillators which are adjacent to each other, the centroid position tends to appear in the elongated distributions A2. Even though γ rays do not cause Compton scattering in the scintillators, in a case where a light leak of the scintillation light generated in a scintillator into the adjacent scintillator occurs, the centroid position may appear in the elongated distribution A2. The two-dimensional map is provided with a plurality of regions to include such circular distributions A1 and elongated distributions A2.

Figure 6:
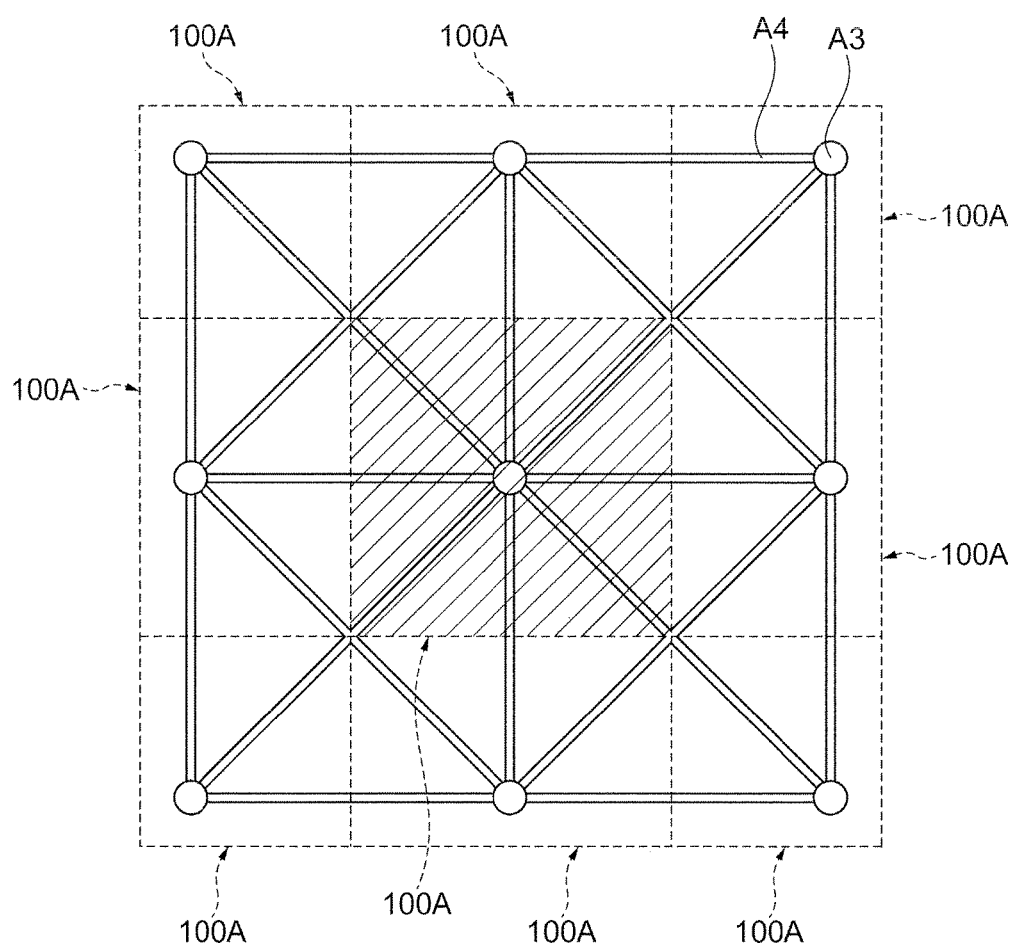
FIG. 6 is a view illustrating an existing two-dimensional map with which the flood map overlaps.

In a two-dimensional map of FIG. 6, as in FIG. 5, for convenience of description, a plurality of scintillator regions 100A respectively corresponding to a plurality of scintillators are shown. In the two-dimensional map of FIG. 6, the plurality of scintillator regions 100A having nine square shapes arranged along each direction of the row direction and the column direction are provided. The scintillator regions 100A respectively correspond to the scintillators. In FIG. 6, for ease of understanding, both circular distributions A3 and elongated distributions A4 which are centroid distributions (the distributions of centroid positions) on the flood map are shown. Each of the circular distributions A3 is a centroid distribution based on scintillation light generated only by one scintillator. The circular distributions A3 are respectively included in the scintillator regions 100A. On the other hand, each of the elongated distributions A2 is a centroid distribution based on scintillation light generated by two scintillators adjacent to each other. The elongated distributions A2 connect the adjacent circular distributions A3 in a lattice pattern or a cross pattern. As illustrated in FIG. 6, the boundary between the scintillator regions 100A is located in the middle between the circular distributions A3 adjacent to each other. The radiation position detector described above determines the region of the two-dimensional map where the centroid position is located. In addition, the radiation position detector described above specifies the scintillator corresponding to the scintillator region 100A where the centroid position is located as the scintillator that initially generates the scintillation light. For example, in a case where the centroid position is located in the circular distribution A3 or the elongated distributions A4 included in the scintillator region 100A (the hatched region in FIG. 6) located at the center of the two-dimensional map, the radiation position detector described above specifies the scintillator corresponding to the scintillator region 100A as the scintillator that initially generates the scintillation light.

However, in such a two-dimensional map, there may be a problem that in a case where γ rays cause Compton scattering and scintillation light is generated by two scintillators adjacent to each other, the scintillator that initially generates scintillation light is erroneously specified. Hereinafter, in order to describe this problem, the characteristics of γ rays that cause Compton scattering will be described.

Figure 7:
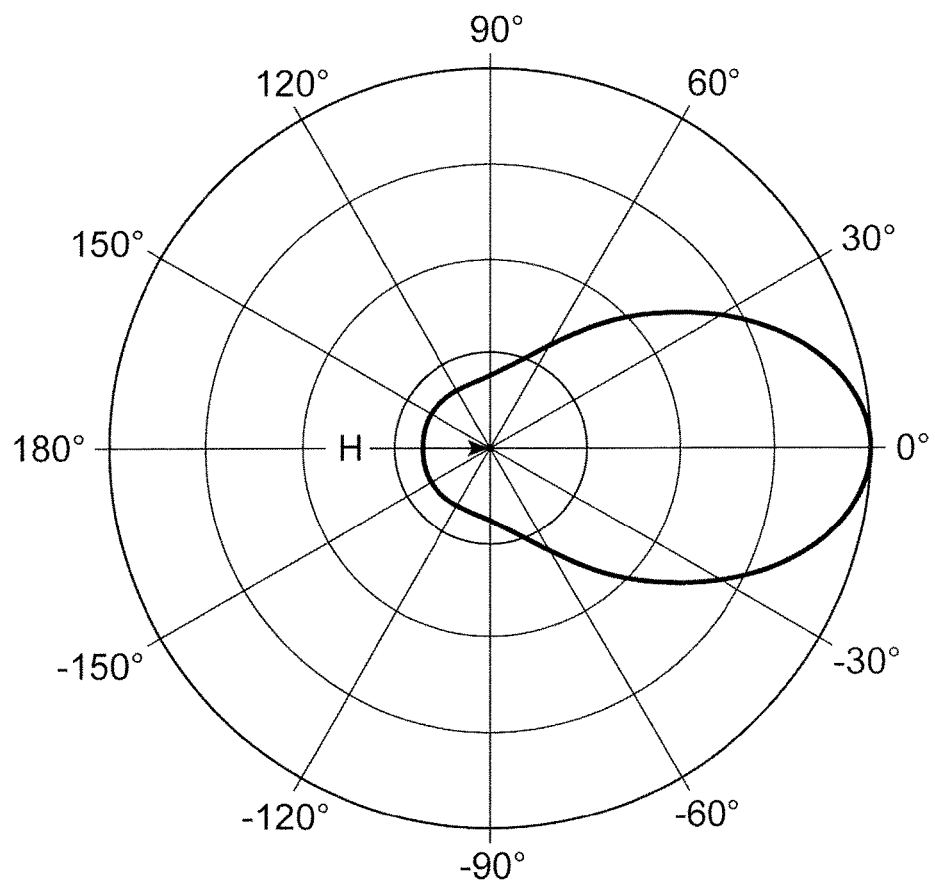
FIG. 7 is a view illustrating the directivity of Compton scattering.
Figure 8:
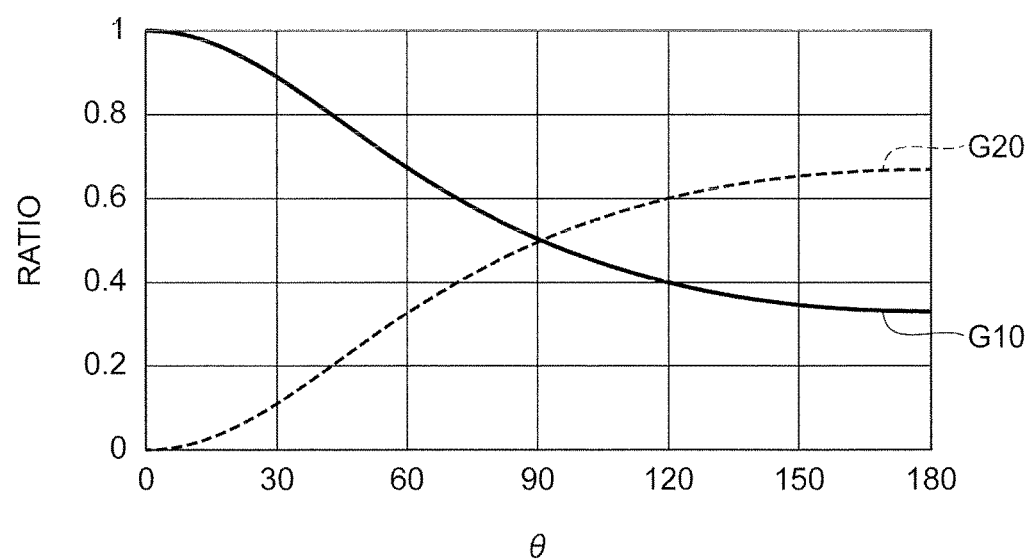
FIG. 8 is a view showing the relationship between a Compton scattering angle and energy values of scattered γ rays and recoil electrons.

As illustrated in FIG. 7, it can be seen that assuming that the angle of the traveling direction of γ rays H (for example, 511 keV) before Compton scattering is 0 degrees, the probability that the angle of the traveling direction of the γ rays H after Compton scattering (Compton scattering angle) with respect to the above angle will be 90 degrees or less is high. A case where the Compton scattering angle is less than 90 degrees is referred to as forward scattering. In FIG. 8, the graph G10 shows scattered γ ray energy $E_S$, and the graph G20 shows recoil electron energy $E_{RE}$ (the energy exerted on the scattering point). In FIG. 8, the vertical axis represents the ratio between the scattered γ ray energy $E_S$ to the recoil electron energy $E_{RE}$, and the horizontal axis represents the Compton scattering angle θ. The scattered γ ray energy $E_S$ and the recoil electron energy $E_{RE}$ at the Compton scattering angle θ are obtained on the basis of the law of conservation of energy. As illustrated in FIG. 8, the scattered γ ray energy $E_S$ takes the maximum value when the Compton scattering angle is 0 degree (that is, when Compton scattering does not occur), decreases as the Compton scattering angle θ increases, and takes the minimum value when the Compton scattering angle is 180 degrees. On the other hand, the recoil electron energy $E_{RE}$ is minimized when the Compton scattering angle is 0 degrees, increases as the Compton scattering angle increases, and reaches the maximum value when the Compton scattering angle is 180 degrees. Therefore, it can be seen that in a case where γ rays cause forward scattering and scintillation light is generated by different scintillators, the intensity of the scintillation light generated after the scattering of the γ rays H tends to be higher than the intensity of the scintillation light initially generated.

Figure 9:
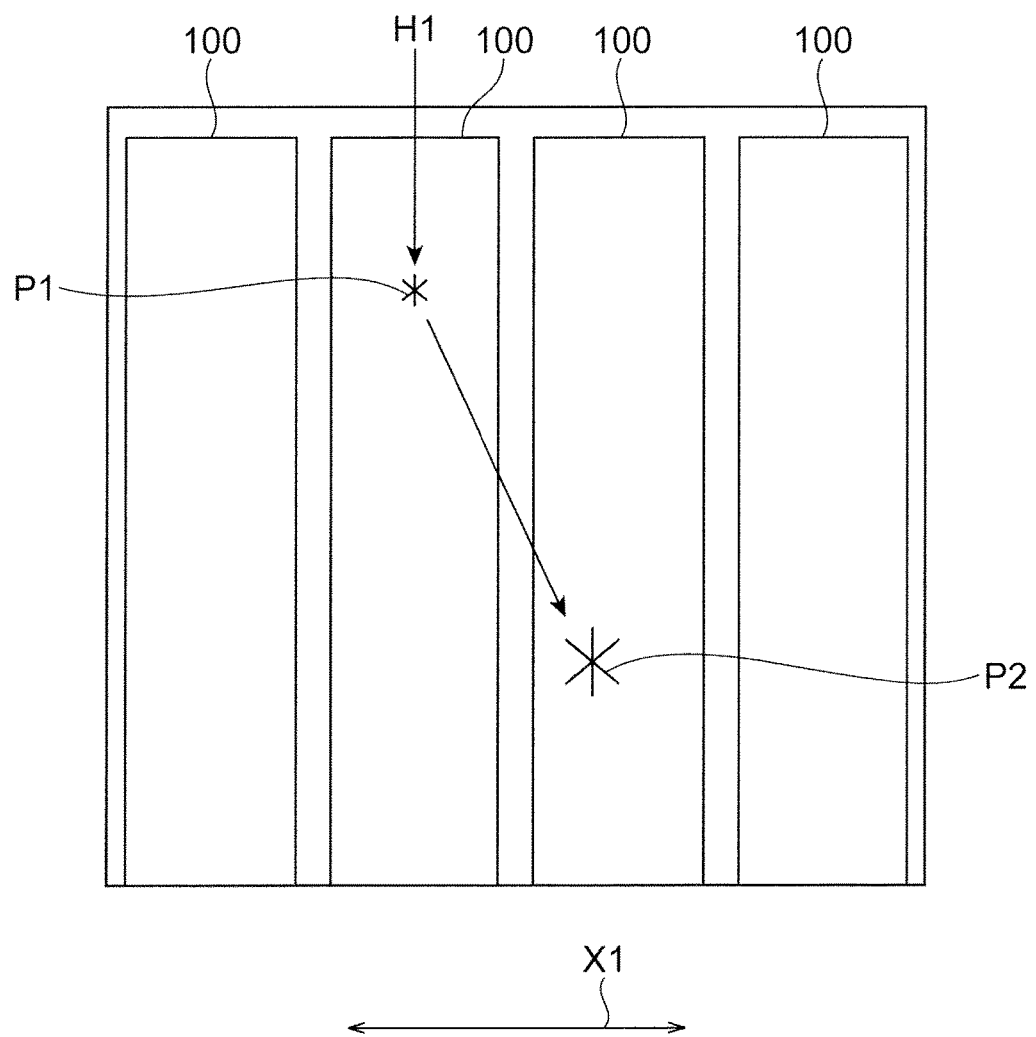
FIG. 9 is a view illustrating a form of forward scattering generated in a scintillator array.

In FIG. 9, four adjacent scintillators 100 are arranged along a column direction X1. As illustrated in FIG. 9, as γ rays H1 cause forward scattering and scintillation light is generated by each of two different scintillators 100. That is, the scintillation light is initially generated at a point P1, and thereafter the scintillation light is generated at a point P2. In this case, as described above, the intensity of the scintillation light at the point P2 becomes higher than the intensity of the scintillation light at the point P1. Therefore, the centroid position of the positions where the scintillation light is generated is located at a position closer to the point P2 than the point P1 where the scintillation light is initially generated in the column direction X1. In other words, the centroid position is located at the position close to the scintillator 100 that generates the scintillation light after the scattering of the γ rays H1 other than the scintillator 100 that initially generates the scintillation light.

Next, with reference to FIG. 6 again based on such characteristics of the γ rays, the above-described problem (that is, the problem that the scintillator 100 that initially generates scintillation light is erroneously specified) will be described.

In FIG. 6, for example, a case where γ rays cause Compton scattering in the scintillator 100 corresponding to the scintillator region 100A (hatched region) at the center of the two-dimensional map and scintillation light is generated by each of the adjacent scintillators 100 is considered. Specifically, a case where scintillation light is initially generated by the scintillator 100 corresponding to the scintillator region 100A at the center and thereafter scintillation light is generated by the scintillator 100 corresponding to the right scintillator region 100A is considered. In this case, the centroid position tends to be located in, other than the scintillator region 100A at the center, the scintillator region 100A on the right side of the scintillator region 100A. Therefore, the radiation position detector described above erroneously specifies the scintillator 100 corresponding to the right scintillator region 100A as the scintillator 100 that initially generates the scintillation light.

Figure 10:
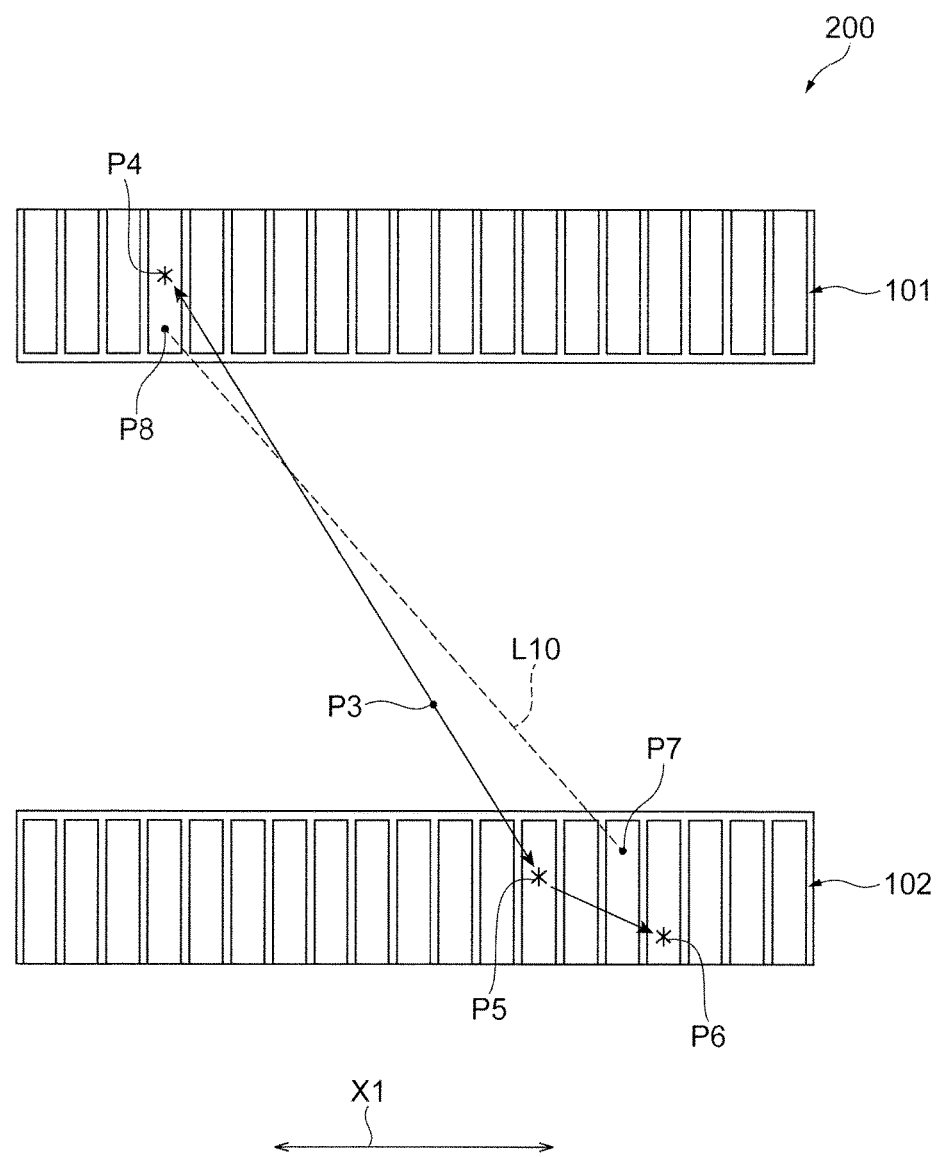
FIG. 10 is a view illustrating effects of erroneous specification of a scintillator in the PET apparatus.

In FIG. 10, two scintillator arrays 101 and 102 included in a PET apparatus 200 are disposed at positions opposing each other with a point P3 interposed therebetween. As illustrated in FIG. 10, one annihilation event occurs at the point P3, and a pair of γ rays emitted in opposite direction are generated. One γ ray of the pair of γ rays arrives at a point P4 of the scintillator array 101. In the scintillator array 101, scintillation light is generated only at the point P4. The other γ ray arrives at a point P5 of the scintillator array 102 and causes Compton scattering. In the scintillator array 102, scintillation light is generated at each of the point P5 and a point P6. In this case, as described above, the centroid position tends to be located at a point P7 closer to the point P6 than the point P5 in a column direction X1. In the scintillator array 102, the radiation position detector described above specifies the scintillator 100 including the point P7 other than the scintillator 100 including the point P5 as the scintillator 100 that initially generates the scintillation light. As a result, the PET apparatus 200 erroneously specifies that the annihilation event had occurred on a straight line L10 connecting the point P7 and a point P8.

In the two-dimensional map M1 of this embodiment, as illustrated in FIG. 3, in a case where scintillation light is generated only by the first scintillator, since the centroid position (X,Y) of the position where the scintillation light is detected is located in the first region R1 corresponding to the first scintillator, the first scintillator is correctly specified as the scintillator 21 that initially generates the scintillation light. Similarly, even in a case where scintillation light is generated only by the second scintillator, the second scintillator is correctly specified as the scintillator 21 that initially generates the scintillation light. Here, in a case where γ rays cause Compton scattering in the first scintillator and scintillation light is generated by each of the first scintillator and the second scintillator, as described above, the intensity of the scintillation light generated by the second scintillator tends to be higher than the intensity of the scintillation light generated by the first scintillator. Therefore, the centroid position (X,Y) of the positions where the scintillation light is generated tends to be located in the fourth region R4 located on the second region R2 side between the first region R1 and the second region R2. Even in this case, since the fourth region R4 corresponds to the first scintillator, the first scintillator is correctly specified as the scintillator 21 that initially generates the scintillation light. Similarly, even in a case where γ rays cause Compton scattering in the second scintillator and scintillation light is generated by each of the first scintillator and the second scintillator, the second scintillator is correctly specified as the scintillator 21 that initially generates the scintillation light. Therefore, with the radiation position detection method, the radiation position detector 10, and the PET apparatus 1 of this embodiment, the scintillator 21 that initially generates scintillation light can be accurately specified.

The light shielding layer 22 that shields scintillation light may be provided between the plurality of scintillators 21. Accordingly, for example, a leak of scintillation light from the first scintillator that generates the scintillation light into the second scintillator can be prevented, and thus the scintillator 21 that initially generates the scintillation light can be more accurately specified.

Each of the plurality of light detectors 31 may be connected to the resistor chain 33. Accordingly, the centroid position (X,Y) of positions where scintillation light is detected can be easily and accurately calculated.

The plurality of second scintillator regions 212 are adjacent to the one first scintillator region 211, the plurality of third regions R3 respectively corresponding to the plurality of second scintillators are separated from each other by the fifth regions R5, and in second step S13, in a case where the centroid position (X,Y) is located in the fifth region R5, the specification of the scintillator 21 that initially generates scintillation light may not be performed. Accordingly, a case where the centroid position (X,Y) of positions where scintillation light is detected is located in the fifth region R5 is cancelled as an inappropriate signal, and thus the specification of the scintillator 21 that initially generates the scintillation light can be simplified.

Figure 11:
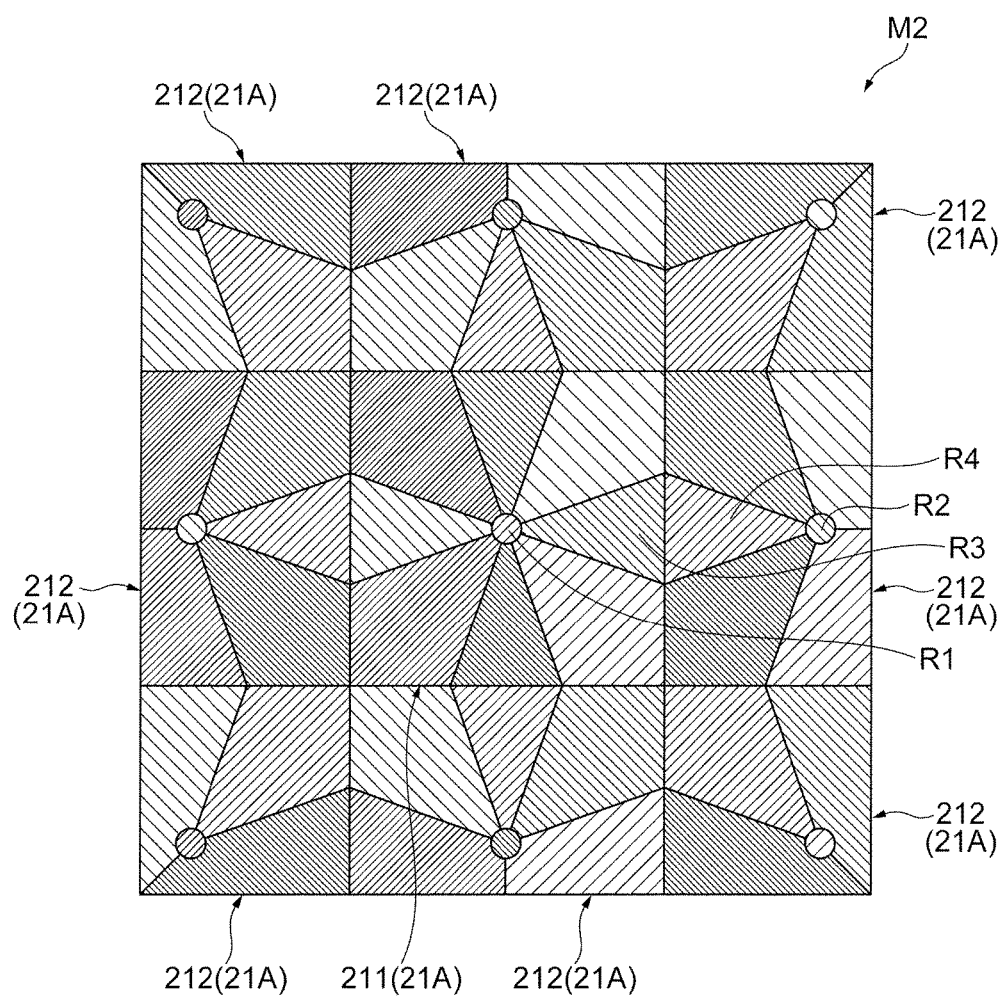
FIG. 11 is a view illustrating another example of the two-dimensional map.
Figure 12:
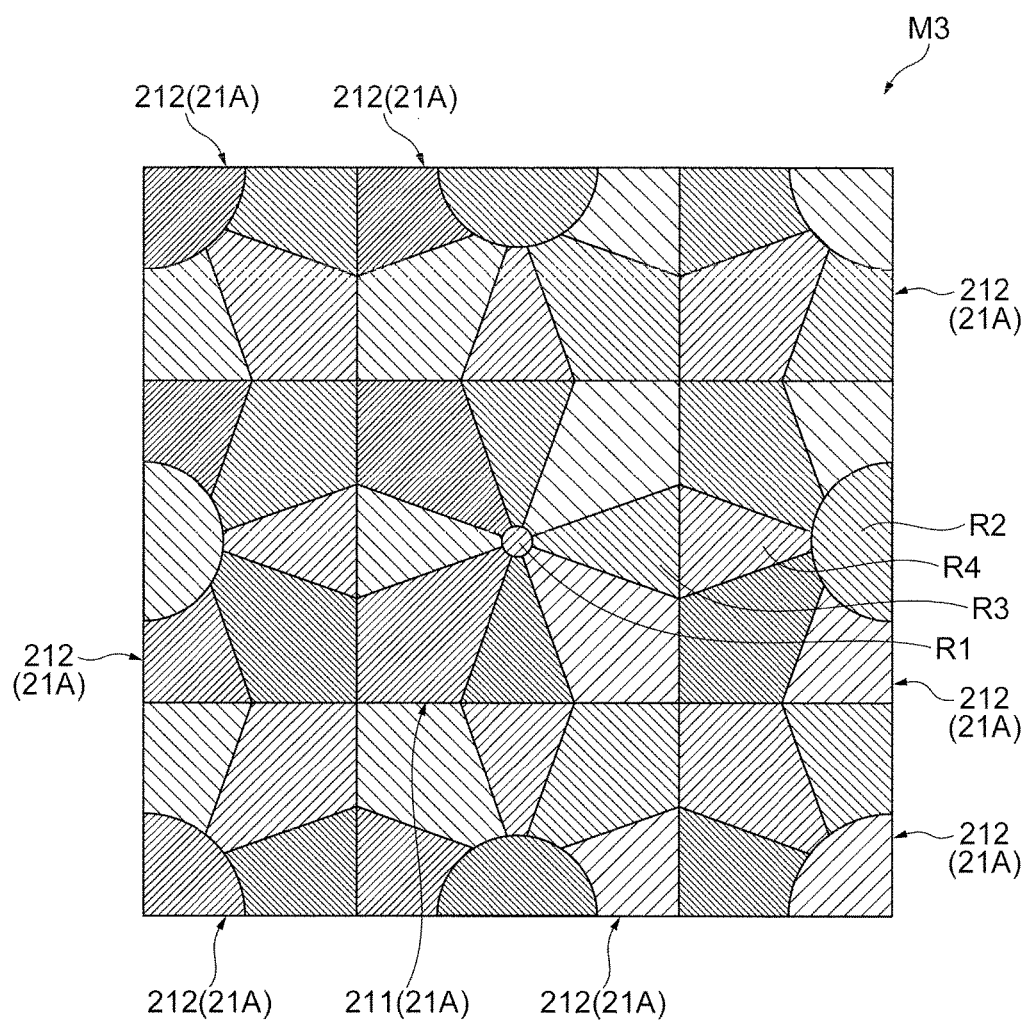
FIG. 12 is a view illustrating another example of the two-dimensional map.

While the embodiment of this disclosure has been described above, this disclosure is not limited to the above-described embodiment. In the above-described embodiment, in the two-dimensional map M1, the fifth regions R5 are shown. However, as illustrated in each of FIGS. 11 and 12, the fifth regions R5 may not be shown in each of a two-dimensional map M2 and M3. In this case, the third regions R3 are in contact with one another. That is, in the first scintillator region 211, the third regions R3 are arranged without gaps around the first region R1. Like the third regions R3, for example, the fourth regions R4 included in the second scintillator region 212 on the right side of the first scintillator region 211 are also in contact with one another. That is, in the second scintillator region 212, the fourth regions R4 are arranged without gaps around the second region R2. Therefore, over the entire two-dimensional map M2 or M3, the first regions R1, the second regions R2, the third regions R3, and the fourth regions R4 are arranged without gaps. The third region R3 adjacent to the right side of the first region R1 is a region surrounded by the first region R1, a first center point, and a second center point. The fourth region R4 adjacent to the left side of the second region R2 is a triangular region surrounded by the second region R2, the first center point, and the second center point. The first center point is the center (centroid) of a triangle connecting the first region R1, the second region R2 included in the second scintillator region 212 on the right side of the first scintillator region 211, and a first midpoint between the first region R1 and the second region R2 included in the second scintillator region 212 on the upper right side of the first scintillator region 211. The second center point is the center (centroid) of a triangle connecting the first region R1, the second region R2 included in the second scintillator region 212 on the right side of the first scintillator region 211, and a second midpoint between the first region R1 and the second region R2 included in the second scintillator region 212 on the lower right side of the first scintillator region 211. The third region R3 adjacent to the upper right side of the first region R1 is a rectangular region surrounded by the first region R1, the first center point, the third center point, and the first midpoint. The third center point is the center (centroid) of a triangle connecting the first region R1, the second region R2 included in the second scintillator region 212 on the upper side of the first scintillator region 211, and the first midpoint. The first center point may also be a midpoint between a third midpoint between the first midpoint and the second region R2 included in the second scintillator region 212 on the right side of the first scintillator region 211, and the second center point may also be a midpoint between the third midpoint and the second midpoint. The third center point may also be a midpoint between the first midpoint and a fourth midpoint between the second region R2 included in the second scintillator region 212 on the upper side of the first scintillator region 211. As described above, since the first regions R1, the second regions R2, the third regions R3, and the fourth regions R4 are arranged without gaps over the entire two-dimensional map M2 or M3, even in a case where the centroid position (X,Y) of positions where scintillation light is detected is located in any region of the two-dimensional map M2 or M3, the specification of the scintillator 21 that initially generates the scintillation light can be performed.

Figure 13:
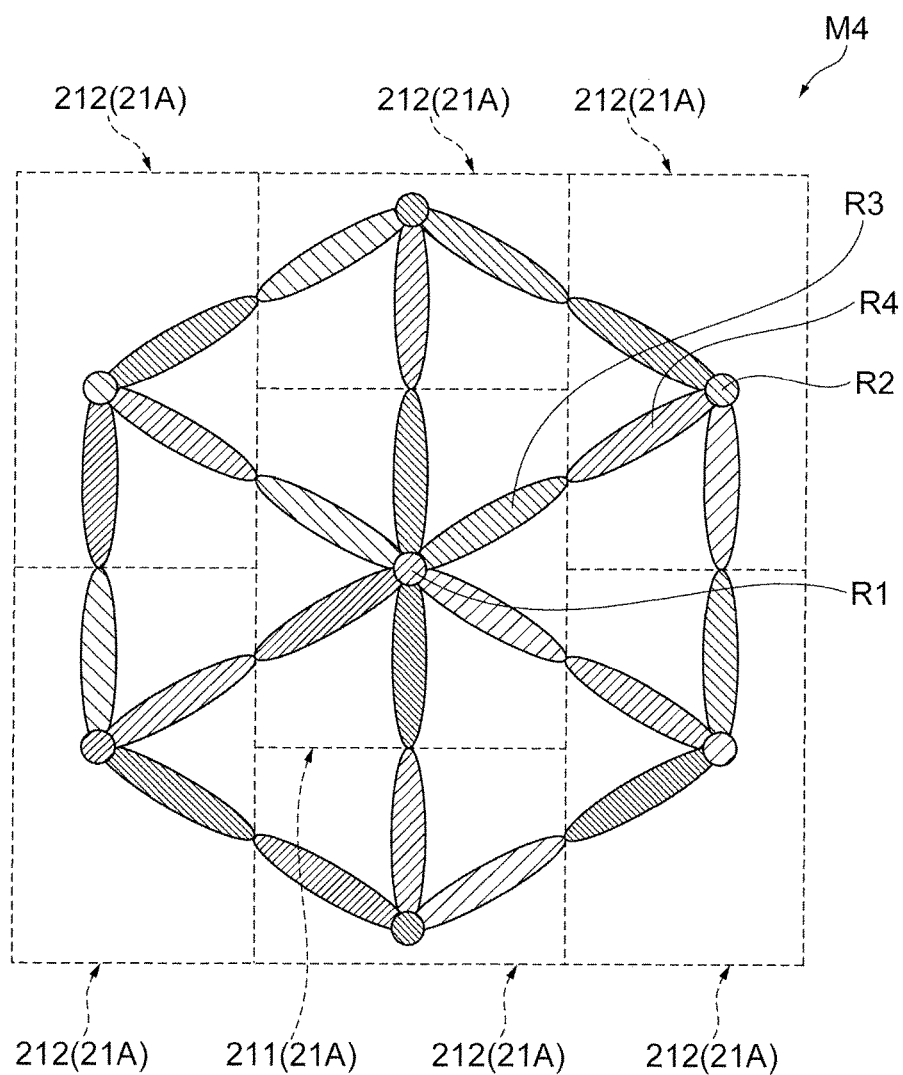
FIG. 13 is a view illustrating another example of the two-dimensional map.

In the above-described embodiment, the scintillator regions 21A shown in the two-dimensional map M1 respectively correspond to the scintillators 21 arranged in a matrix form. However, as illustrated in FIG. 13, each of the scintillator region 21A shown in a two-dimensional map M4 may correspond to the scintillator 21 disposed such that the scintillators 21 adjacent to each other in the right and left directions are shifted by a half pitch in the up and down directions. That is, in the two-dimensional map M4, the first regions R1 and the second regions R2 may be arranged in a triangular lattice pattern. In this case, the third regions R3 and the fourth regions R4 connect the first regions R1 and the second regions R2 in a triangular lattice pattern. Accordingly, the first regions R1, the second regions R2, the third regions R3, and the fourth regions R4 can be arranged corresponding to the arrangement of the scintillators 21.

The radiation position detection method, the radiation position detector, and the PET apparatus according to the embodiment of this disclosure are not limited to the above-described embodiment, and various other modifications can be made. For example, in the above-described embodiment, the light shielding layer 22 is provided between the plurality of scintillators 21. However, the light shielding layer 22 may not be provided. In the above-described embodiment, γ rays are detected. However, the radiation to be detected is not limited to the γ rays. The radiation may be, for example, X-rays.

REFERENCE SIGNS LIST

1: PET apparatus, 10: radiation position detector, 20: scintillator array, 21: scintillator, 22: light shielding layer, 30: light detector array, 31: light detector, 33: resistor chain, 40: calculation unit, 50: specifying unit, 211: first scintillator region, 212: second scintillator regions, V1,V2,V3,V4: electrical signal, M1,M2,M3,M4: two-dimensional map, R1: first region, R2: second region, R3: third region, R4: fourth region, R5: fifth region.

What is claimed is:

1. A radiation position detection method performed by a radiation position detector including a scintillator array in which a plurality of scintillators that absorb radiation and generate scintillation light are two-dimensionally arranged, and a light detector array in which a plurality of light detectors that output an electrical signal in response to an intensity of the scintillation light are arranged to correspond to the plurality of scintillators, the method comprising:
    a first step of calculating a centroid position of positions where the scintillation light is detected on the basis of the electrical signal; and
    a second step of specifying the scintillator that initially generates the scintillation light on the basis of a two-dimensional map showing regions for identifying the plurality of scintillators and the centroid position,
    wherein the regions shown in the two-dimensional map include
        a first region corresponding to a first scintillator which is one of the plurality of scintillators,
        a second region corresponding to a second scintillator adjacent to the first scintillator among the plurality of scintillators,
        a third region that is located on the first region side between the first region and the second region and corresponds to the second scintillator, and
        a fourth region that is located on the second region side between the first region and the second region and corresponds to the first scintillator, and
    in the second step, in a case where the centroid position is located in the first region or the fourth region, the first scintillator is specified as the scintillator that initially generates the scintillation light, and in a case where the centroid position is located in the second region or the third region, the second scintillator is specified as the scintillator that initially generates the scintillation light.

2. The radiation position detection method according to claim 1,
    wherein a light shielding layer that shields the scintillation light is provided between the plurality of scintillators.

3. The radiation position detection method according to claim 2,
    wherein each of the plurality of light detectors is connected to a resistor chain.

4. The radiation position detection method according to claim 2,
    wherein the single first scintillator is adjacent to a plurality of the second scintillators,
    a plurality of the third regions respectively corresponding to the plurality of second scintillators are separated from each other by fifth regions, and
    in the second step, in a case where the centroid position is located in the fifth region, specification of the scintillator that initially generates the scintillation light is not performed.

5. The radiation position detection method according to claim 2,
    wherein the single first scintillator is adjacent to a plurality of the second scintillators, and
    a plurality of the third regions respectively corresponding to the plurality of second scintillators are in contact with one another.

6. The radiation position detection method according to claim 1,
    wherein each of the plurality of light detectors is connected to a resistor chain.

7. The radiation position detection method according to claim 6,
    wherein the single first scintillator is adjacent to a plurality of the second scintillators,
    a plurality of the third regions respectively corresponding to the plurality of second scintillators are separated from each other by fifth regions, and
    in the second step, in a case where the centroid position is located in the fifth region, specification of the scintillator that initially generates the scintillation light is not performed.

8. The radiation position detection method according to claim 6,
    wherein the single first scintillator is adjacent to a plurality of the second scintillators, and
    a plurality of the third regions respectively corresponding to the plurality of second scintillators are in contact with one another.

9. The radiation position detection method according to claim 1,
    wherein the single first scintillator is adjacent to a plurality of the second scintillators,
    a plurality of the third regions respectively corresponding to the plurality of second scintillators are separated from each other by fifth regions, and
    in the second step, in a case where the centroid position is located in the fifth region, specification of the scintillator that initially generates the scintillation light is not performed.

10. The radiation position detection method according to claim 1,
    wherein the single first scintillator is adjacent to a plurality of the second scintillators, and
    a plurality of the third regions respectively corresponding to the plurality of second scintillators are in contact with one another.

11. A radiation position detector comprising:
    a scintillator array in which a plurality of scintillators that absorb radiation and generate scintillation light are two-dimensionally arranged;
    a light detector array in which a plurality of light detectors that output an electrical signal in response to an intensity of the scintillation light are arranged to correspond to the plurality of scintillators;
    a calculation unit which calculates a centroid position of positions where the scintillation light is detected on the basis of the electrical signal; and
    a specifying unit which specifies the scintillator that initially generates the scintillation light on the basis of a two-dimensional map showing regions for identifying the plurality of scintillators and the centroid position, wherein, in the two-dimensional map, a first scintillator and a second scintillator which are adjacent to each other among the plurality of scintillators are shown, the regions shown in the two-dimensional map include
- a first region corresponding to the first scintillator which is one of the plurality of scintillators,
- a second region corresponding to the second scintillator adjacent to the first scintillator among the plurality of scintillators,
- a third region that is located on the first region side between the first region and the second region and corresponds to the second scintillator, and
- a fourth region that is located on the second region side between the first region and the second region and corresponds to the first scintillator, and the specifying unit specifies, in a case where the centroid position is located in the first region or the fourth region, the first scintillator as the scintillator that initially generates the scintillation light, and specifies, in a case where the centroid position is located in the second region or the third region, the second scintillator as the scintillator that initially generates the scintillation light.

12. A PET apparatus comprising:
the radiation position detector according to claim 11.

* * * * *